Nov. 10, 1970    J. R. PARKINSON ETAL    3,538,762
PHASE DISPLACEMENT TORQUE MEASURING SYSTEM WITH SHAFT
MISALIGNMENT COMPENSATION TECHNIQUE
Filed March 8, 1968

INVENTORS
JAMES R. PARKINSON
GEORGE A. GALLANT
SYDERIUS VAN MANEN

ATTORNEY

United States Patent Office 3,538,762
Patented Nov. 10, 1970

3,538,762
PHASE DISPLACEMENT TORQUE MEASURING SYSTEM WITH SHAFT MISALIGNMENT COMPENSATION TECHNIQUE
James R. Parkinson, Vergennes, and George A. Gallant and Syderius Van Manen, Middlebury, Vt., assignors to Simmonds Precision Products, Inc., Tarrytown, N.Y., a corporation of New York
Filed Mar. 8, 1968, Ser. No. 711,678
Int. Cl. G01l 3/10
U.S. Cl. 73—136                                                    7 Claims

ABSTRACT OF THE DISCLOSURE

A phase displacement torque measuring system utilizing a pair of exciter wheels mounted in spaced relationship on the shaft and having a pair of transducers mounted adjacent the wheels for generating alternating signals having a phase displacement indicative of the torsional deflection of the shaft; a third wheel is mounted on the shaft such that all the wheels are equally spaced from each other and an additional transducer is mounted adjacent the third wheel to generate an alternating signal having a phase displacement indicative of the misalignment of the shaft with respect to a centerline extending through the three transducers. A phase detection circuit is connected to each of the transducers and is provided with a voltage triggering means and a differentiator circuit for producing a D.C. pulsed output indicative of the phase displacement between the alternating signals.

---

This invention relates to an apparatus for measuring torque and more particularly, a phase displacement torque measuring system in which a plurality of variable reluctance magnetic pick-offs sense the angular position between sets of magnetic gears axially displaced on the torque shaft wherein the phase relationship of the resultant signals is a measure of shaft twist or torque.

Normally, the torque shaft assembly contains two exciter wheels of magnetic steel attached to the torque transmitting shaft at different axial stations. As torque is increased, the exciter wheels experience a rotational deflection with respect to each other that is directly proportional to the applied torque. The torque sensor utilizes two magnetic pick-ups, each of which is mounted in close proximity to each of the exciter wheels, thereby yielding two nearly sinusoidal signals as the exciter wheel teeth pass the sensor pole pieces. The phase relationship of the two signals generated is directly related to the relative displacement of the exciter wheels and is therefore directly related to the applied torque. The two pickup signals are then fed to the appropriate inputs of a torque indicator which detects the phase relationship of the incoming signals and feeds the same to a closed loop servo which displays this relationship as units of torque (in pounds or foot pounds), percent of full torque or other suitable measuring units. In order to determine torque accurately, however, it is necessary to determine the phase relationship of these incoming signals over ambient temperature ranges from at least −65° to 170° F. These incoming signals will vary in frequency and amplitude since both frequency and amplitude modulation are present, as well as a certain amount of harmonic distortion. It has been the common practice to determine the zero cross-over of each of the incoming signals as a means for measuring phase displacement by clipping the incoming torque signals. This practice requires that the positive and negative portions of the incoming signal be identical and also that the positive and negative portions be limited identically so that the zero cross-over cannot be changed. Further, this practice is complicated by matching the gains of both channels for their respective incoming signals. A further complication exists when the torque shaft becomes misaligned, that is, out of parallelism with the centerline of the torque pick-up transducers and this misalignment will be sensed and displayed as an increase or decrease in transmitted torque. It is the purpose of this invention to overcome the above-described complications and difficulties and thus render a system which will provide an accurate indication of torque by an improved phase displacement zero crossover detection circuit for torque measuring systems in which, in addition, compensation is provided for torque shaft misalignment with respect to the pick-up transducers.

Accordingly, it is an object of this invention to provide a phase displacement torque measuring system in which accurate determination of the zero crossing points of the signals generated by the magnetic pick-offs is achieved.

It is another object of this invention to provide a phase displacement torque measuring system in which accurate determination of the zero cross-over points of the phase displaced incoming signals is accurately achieved by the use of trigger voltages in place of amplifying and clipping techniques.

It is yet another object of this invention to provide a phase displacement torque measuring system in which an error compensating technique is employed for accurately determining the phase displacement between the signals generated by the pick-off transducers.

It is still yet another object of this invention to provide a compensating technique for torque shaft misalignment with respect to the array of transducer pick-offs.

According to one embodiment utilizing the principles of this invention, there is provided a torque shaft assembly having three exciter wheels, one of which is a torque wheel attached directly to the shaft, the second, a reference wheel, attached to a reference sleeve which, in turn, is attached to the shaft spaced from the torque wheel, and and a third, a position wheel, attached directly to the reference sleeve which is in no way affected by transmitted torque. A pick-off magnetic sensor is positioned in close proximity to each of the exciter wheels. The center-to-center distance between the reference wheel and the position wheel is made identical to the center distance between the reference wheel and the torque wheel. This configuration causes an identical phase shift change in the position signal and in the torque signal, both with respect to the reference signal. As shaft torque is increased, the torque signal phase shift increases in direct proportion. Hence, the torque signal is comprised of a phase shift due to both shaft torque and a phase shift due to shaft position. In order to obtain an accurate determination of shaft torque, it is necessary then to cancel the position signal, that is, the amount of phase shift in the torque signal caused by misalignment. The composite torque signal is fed to a zero cross-over detector that produces a D.C. voltage directly related to the total phase shift between the torque and reference signals. The position signal is also fed to a position zero cross-over detector that similarly produces a D.C. voltage directly related to the total phase shift between the position and reference signals. Because of the identical center-to-center distances between the exciter wheels, a shaft misalignment will create identical phase shift changes in opposite directions. These phase shift signals are accurately detected by a tunnel diode trigger voltage generating technique and thereby subsequently cancelled by means of algebraic summation. The D.C. voltage remaining is then indicative of the component phase shift of the torque composite signal that is linearly and directly related to transmitted torque in the shaft.

Other objects and advantages will become apparent from a study of the following specification and drawings, in which.

Figure 1:
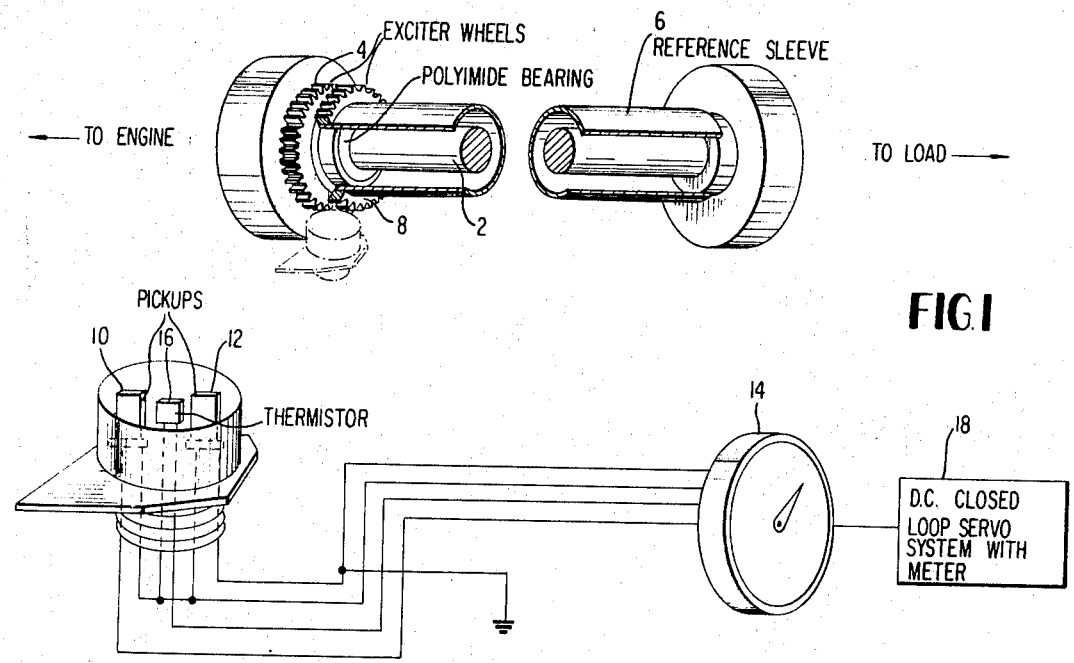
FIG. 1 shows a conventional arrangement of a torque measuring system.

Referring now to FIG. 1, there is shown a conventional torque measuring system, more particularly described in assignee's Patent No. 3,258,961, issued to S. Van Manen on July 5, 1966, which describes a torque measuring system having two toothed wheels spaced along an engine shaft. The rotation of the wheels is translated into alternating current signals which have a phase displacement corresponding to the relative rotational movement of the two toothed wheels that is directly related to the torsional deflection of the shaft. A means is also provided for measuring the phase displacement on a calibrated meter in percentage torque values. For example, there is shown in FIG. 1 a shaft 2, the torque of which is to be measured. One end of the shaft is connected to a source of power, for example, an engine or the like, and the other end of the shaft is connected to a load. Mounted for direct engagement with the shaft is a toothed exciter wheel 4. Spaced from the wheel 4 and again mounted for direct engagement with the shaft 2 is a hollow reference sleeve 6. The sleeve 6 engages the shaft at one of its ends and extends therefrom in spaced coaxial alignment to a position adjacent the exciter wheel 4. The free end of the reference sleeve 6 fixedly supports a second toothed exciter wheel 8. A torque pick-up assembly is provided and consists of two magnetic sensors 10 and 12, each of which is mounted in close proximity to each of the exciter wheels 4, 8, thereby yielding two nearly sinusoidal signals as the exciter wheel teeth pass the sensor pole pieces in the respective magnetic pick-ups 10, 12. When the shaft 2 rotates, the torque increases and the exciter wheels experience a rotational deflection with respect to each other that is directly proportional to the applied torque to the shaft. Consequently, the phase relationship of the two signals generated in the pick-ups is directly related to the relative angular displacement of the exciter wheels and is therefore directly related to the applied torque. As shown, the pickup signals are fed to appropriate inputs of a conventional torque indicator 14. A suitable temperature compensating means, such as a thermistor 16, may be positioned between the pick-ups 10 and 12 and may be ground biased and fed to the indicator 14 as shown. At the indicator the phase relationship of the signals is detected and fed to a D.C. closed loop servo system 18 which displays, through a suitable meter, the phase relationship as units of torque, percent of full torque, or other suitable measuring units.

Figure 3:
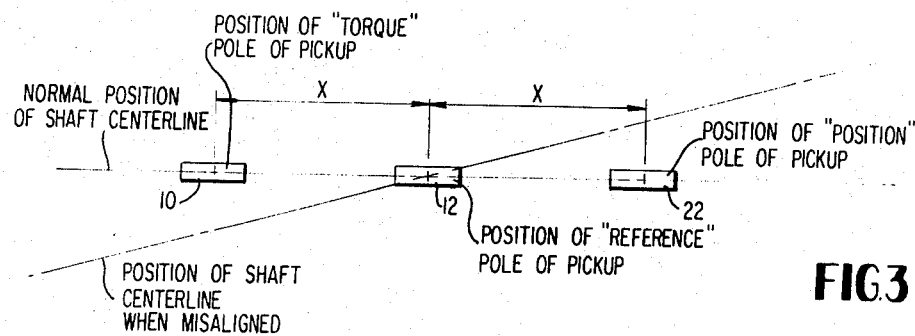
FIG. 3 is a schematic diagram illustrating the principles of this invention.
Figure 2:
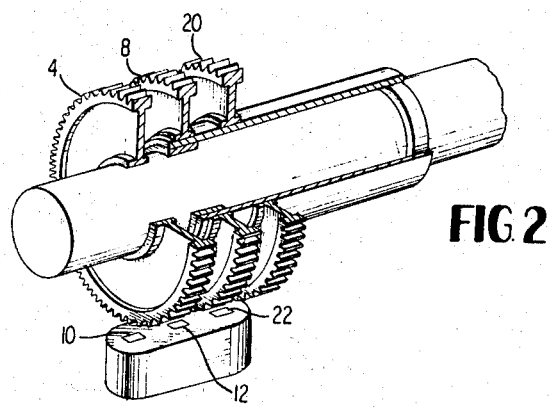
FIG. 2 illustrates in perspective an embodiment according to the present invention.

A serious limitation exists with the torque measuring system above-described in that any misalignment of the shaft 2 with respect to the centerline of the torque pick-up transducers 10 and 12 will be sensed and displaced as an increase or decrease in transmitted torque thereby affecting the accuracy of the torque being measured. Referring now to FIG. 2, there is shown a system according to this invention which will compensate for misalignment errors. The basic torque system as described in FIG. 1 is again employed. In addition, however, a third exciter wheel 20 and a third magnetic pick-up sensor 22 are provided. The third exciter wheel 20, which will be referred to as the position wheel, is attached directly to the reference sleeve 6 such that the center-to-center distance between the reference wheel 8 and the position wheel 20 is equal to the center-to-center distance between the torque wheel 4 and the reference wheel 8. The position pick-up sensor 22 is then placed in closed proximity to the position wheel 20 and generates a signal whose frequency is identical to that of the reference and torque wheels 4 and 8 as above described. The object now is to discern what proportion of the total phase shift between the torque and reference signals is a function of transmited shaft torque and to fully eliminate any effects of that portion of the phase shift that might be a function of torque shaft misalignment. As shown in FIG. 2, with identical center-to-center distances between the exciter wheels, a misalignment in the shaft 2 will create identical phase shift changes in opposite directions. This is best shown in FIG. 3 wherein the three pick-ups 10, 12, 22 are shown in an aligned array adjacent their respective exciter wheels. The centerline of the shaft 2 is shown to be askew or misaligned with respect to the centerline of the respective pick-ups 10, 12, 22. Thus, as a phase shift change is created between the reference signal and the torque signal due to shaft misalignment, the same phase shift change is created in the opposite direction between the reference signal and the position signal. These two phase shift signals are converted to proportional D.C. voltages and then algebraically summed to thereby cancel with the resultant D.C. voltage being directly proportional to transmitted torque in the shaft 2. The phase changes between the signals generated from the magnetic pick-up sensor 10, 12 and 22, as above discussed, are detected by zero cross-over circuitry which generates trigger voltages for determining the phasing of the incoming signals.

Figure 4:
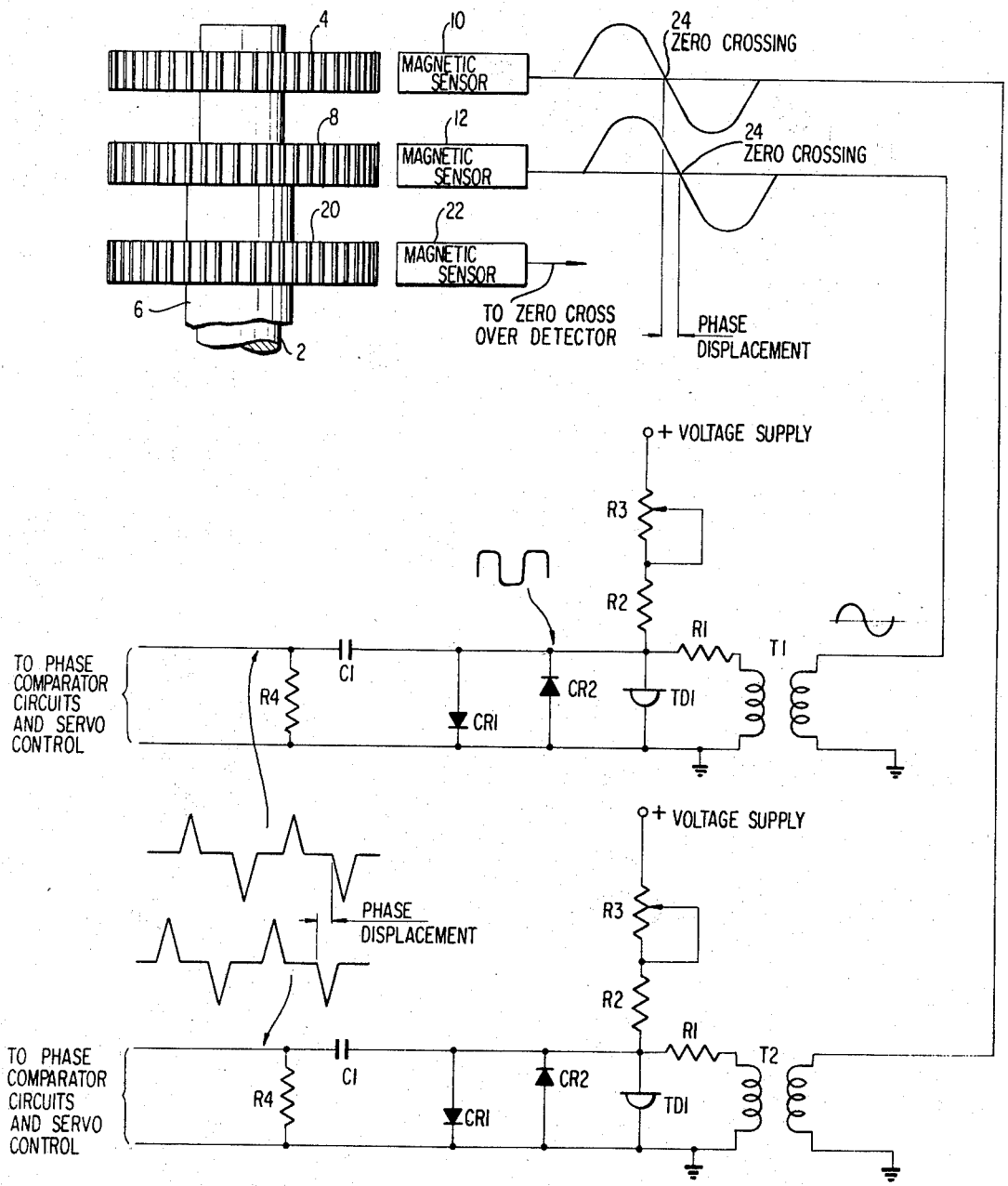
FIG. 4 is a circuit diagram illustrating the phase displacement torque measuring system according to this invention.

Referring now to FIG. 4, the three magnetic pick-up sensors 10, 12 and 22 are shown positioned adjacent their respective exciter wheels 4, 8 and 20 located on the shaft 2 in the manner above described. The incoming signals from the pick-ups each will vary in frequency and amplitude and also they will have both frequency and amplitude modulation present, as well as a certain amount of harmonic distortion. The torque sensors, according to this invention, are designed so that accurate determination of the zero crossing points 24 of the sinusoidal signals will indicate phase shift accurately. As shown, each of the incoming signals is applied to a zero cross-over detection circuit, two of which are shown for purposes of illustration. Since these circuits are identical, it will suffice to describe only one. The incoming signal from one of the magnetic pick-up sensors is applied to a transformer T1 which acts as a step-up transformer to match the transducer to the zero cross-over network. The transformer voltage ratio is constant over the frequency range of interest and the phase shift of the transformer is matched over this frequency range of interest to eliminate possible phase errors from this source. The signal is then applied to a tunnel diode TD1 through a fixed resistor R1. In order to determine the zero crossing accurately, the tunnel diode is biased by a D.C. voltage developed through resistors R1, R2 and R3 to a positive voltage supply. The bias is adjusted by the potentiometer resistor R3, such that the tunel diode current is at its peak point. The added current resulting from the input signal results in the tunnel diode TD1 exceeding its peak point and driving it into tis negative resistance area wherein the tunnel diode switches to a new stable state. The tunnel diode then switches to its original state as the signal reverses. The resultant signal has sharp leading and trailing edges with a level clamped by silicon diodes CR1 and CR2 which are connected in parallel across the tunnel diode TD1. The signal is then differentiated by a differentiator circuit composed of capacitor C1 and resistor R4 to thereby generate positive and negative spikes, as shown. The circuit is then adjusted dynamically such that the positive spike is generated at the positive zero cross-over of the incoming signal. In order to assure temperature stability the tunnel diode TD1 is matched for firing point vs. temperature ensuring that extraneous phase shifts are not introduced in this manner. It should be also noted that the transformer T1 is not necessary to the proper operation of the zero cross-over network, its function being impedance matching only, and in some cases the zero cross-over network can be driven directly from the pick-up sensor. As shown in FIG. 4, the resultant D.C. voltage will be directly related to the total phase shift between the torque signal coming from the magnetic pick-up sensor 10 and the reference signal coming from the magnetic pick-up sensor 12. Similarly, the position signal coming from the magnetic pick-up sensor 22 is fed to a position zero cross-over detector network, similar to that above described, that produces a D.C. voltage which is directly related to the total phase shift between the position signal and the reference signal. As previously discussed, a shaft misalignment between the shaft 2 and the centerline of the pick-ups 10, 12 and 22 will create identical phase shift changes in opposite directions. These phase shift changes will then be accurately detected in the manner above described and will subsequently cancel by way of algebraic summation when the D.C. voltages are fed to the phase comparator circuits, as shown. The comparator circuits and servo control loops are of conventional design as discussed above and will render a meter reading in units of torque, percent of full torque, or some such other desirable measuring unit.

Although only a single embodiment of the invention has been depicted and described, it will be apparent that this embodiment is illustrative in nature and that a number of modifications in the apparatus and variations in its end use may be effected without departing from the spirit or scope of the invention as defined in the appended claims.

What is claimed is:

1. In a rotary shaft torque measuring system, the combination comprising, a first toothed wheel attached directly to the rotary shaft, a sleeve attached at one end to the shaft at a point spaced from the first wheel, the other end of said sleeve being free and extending in spaced coaxial alignment with the rotary shaft to a position adjacent the first wheel, a second toothed wheel supported to the free end of said sleeve, transducer means mounted adjacent said toothed wheels for generating alternating signals in response to the rotation of said wheels having a phase displacement indicative of torsional deflection of said shaft, a third toothed wheel supported on said sleeve in spaced apart relationship with respect to said first and second wheels, a second transducer means mounted adjacent said third wheels for generating an alternating signal in response to the rotation thereof and having a phase displacement indicative of shaft misalignment with respect to a centerline through said transducer means, a phase detection circuit connected to said first and second transducer means for producing an output signal indicative of the phase displacement between said alternating signals.

2. In a system according to claim 1, wherein said first and said second toothed wheels and said third toothed wheel are equally spaced with respect to each other.

3. In a rotary shaft torque measuring system, the combination comprising, a first toothed wheel attached directly to the rotary shaft, a sleeve attached at one end to the shaft at a point spaced from the first wheel, the other end of said sleeve being free and extending in spaced coaxial alignment with the rotary shaft to a position adjacent the first wheel, a second toothed wheel supported to the free end of said sleeve, first transducer means mounted adjacent said wheels for generating alternating signals in response to the rotation thereof and having a phase displacement indicative of the torsional deflection of said shaft, a third toothed wheel mounted on said sleeve in spaced relationship with respect to said first and second wheels, a second transducer means mounted adjacent said third wheel for generating an alternating signal in response to the rotation thereof and having a phase displacement indicative of a misalignment of said shaft with respect to a centerline through said transducer means, a phase detection circuit connected to said transducer means having a voltage triggering means and a differentiator circuit for producing an output signal indicative of the phase displacement between said alternating signals.

4. In a rotary shaft torque measuring system, the combination comprising, a plurality of spaced apart toothed wheels positioned along said shaft, a reference sleeve attached at one end to the rotary shaft, the other end being free and extending in spaced coaxial alignment with the shaft, one of said wheels being mounted to the shaft adjacent the other end of the sleeve, another of said wheels being mounted to the sleeve in spaced apart relationship, transducer means mounted adjacent said toothed wheels for generating alternating signals in response to the rotation thereof and having a phase displacement indicative of the torsional deflection of said shaft, a phase detection circuit connected to said transducer means, said circuit having a resistance means and tunnel diode means serially connected across said transducer means, said alternating signals having a peak value greater than the level necessary to exceed the peak current value of said tunnel diode, and a differentiating circuit including a resistor and capacitor connected across said tunnel diode for generating positive and negative signals at the zero cross-over points of said alternating signals.

5. In a rotary shaft torque measuring system comprising, a torque wheel mounted directly to the shaft, a reference sleeve attached at one end to the shaft at a point spaced from the torque wheel, the other end of said sleeve being free and extending in spaced coaxial alignment with the shaft to a position adjacent the torque wheel, a reference wheel mounted to the free end of said sleeve, a third wheel mounted adjacent to the attached end of the sleeve, transducer means mounted adjacent said wheels for generating alternating signals in response to rotation thereof and having a phase displacement indicative of the torsional deflection of said shaft, a phase detection circuit connected to said transducer means, said circuit having a resistance means and tunnel diode means serially connected across said transducer means, said alternating signals having a peak value greater than the level necessary to exceed the peak current value of said tunnel diode, and a differentiating circuit including a resistor and capacitor connected across said tunnel diode for generating positive and negative signals at the zero cross-over points of said alternating signals.

6. In a system according to claim 5, wherein said torque and reference wheels and said third wheel are equally spaced with respect to each other.

7. In a rotary shaft torque measuring system, the combination comprising, a toothed torque wheel mounted directly to said shaft, a reference sleeve attached at one end to the shaft at a point thereon spaced from the torque wheel, the other end of said sleeve being free and extending in spaced coaxial alignment with the shaft to a position adjacent the torque wheel, a toothed reference wheel mounted to the free end of said sleeve, first transducer means mounted adjacent said wheels for generating alternating signals in response to the rotation thereof and having a phase displacement indicative of the torsional deflection of said shaft, a third toothed wheel mounted on said sleeve in spaced-apart relationship from said torque and reference wheels, and a third transducer means mounted adjacent said third wheel for generating an alternating signal in response to the rotation thereof and having a phase displacement indicative of the misalignment of said shaft with respect to a centerline through said transducer means.

References Cited

UNITED STATES PATENTS

| | | | |
|---|---|---|---|
| 3,258,961 | 7/1966 | Van Manen | 73—136 XR |
| 3,286,176 | 11/1966 | Birnboim | 307—232 |

FOREIGN PATENTS

| | | |
|---|---|---|
| 601,460 | 5/1948 | Great Britain. |
| 627,565 | 8/1949 | Great Britain. |

CHARLES A. RUEHL, Primary Examiner